(12) United States Patent
Lambricht et al.

(10) Patent No.: US 12,208,682 B2
(45) Date of Patent: Jan. 28, 2025

(54) VEHICLE CONTROL DEVICE AND MANUFACTURING METHOD THEREOF

(71) Applicants: AGC GLASS EUROPE, Louvain-la-Neuve (BE); INTERNATIONAL AUTOMOTIVE COMPONENTS GROUP GMBH, Duesseldorf (DE)

(72) Inventors: Thomas Lambricht, Perwez (BE); Laurent Vandievoet, Fleurus (BE); Carter Scott Cannon, Munich (DE); Sung-Uk Kim, Grafing (DE)

(73) Assignees: AGC GLASS EUROPE, Louvain-la-Neuve (BE); INTERNATIONAL AUTOMOTIVE COMPONENTS GROUP GMBH, Duesseldorf (DE)

( * ) Notice: Subject to any disclaimer, the term of this patent is extended or adjusted under 35 U.S.C. 154(b) by 715 days.

(21) Appl. No.: 17/278,550

(22) PCT Filed: Sep. 25, 2019

(86) PCT No.: PCT/EP2019/075922
§ 371 (c)(1),
(2) Date: Mar. 22, 2021

(87) PCT Pub. No.: WO2020/064868
PCT Pub. Date: Apr. 2, 2020

(65) Prior Publication Data
US 2021/0347260 A1 Nov. 11, 2021

(30) Foreign Application Priority Data

Sep. 25, 2018 (DE) ...................... 10 2018 123 617.4

(51) Int. Cl.
*B60K 35/00* (2024.01)
*G06F 3/01* (2006.01)
(Continued)

(52) U.S. Cl.
CPC .............. *B60K 35/00* (2013.01); *G06F 3/016* (2013.01); *G06F 3/0488* (2013.01); *H04W 4/80* (2018.02);
(Continued)

(58) Field of Classification Search
CPC .............. B60K 35/00; B60K 2370/111; B60K 2370/141; B60K 2370/1438;
(Continued)

(56) References Cited

U.S. PATENT DOCUMENTS 10,300,760 B1 * 5/2019 Aikin ...................... B60G 17/08
2014/0139451 A1 * 5/2014 Levesque ................ G06F 3/016
345/173

(Continued)

FOREIGN PATENT DOCUMENTS

EP 2 889 726 A1 7/2015
EP 3 040 843 A1 7/2016

OTHER PUBLICATIONS

International Search Report issued on Dec. 17, 2019 in PCT/EP2019/075922 filed on Sep. 25, 2019, 4 pages.

*Primary Examiner* — Behrang Badii
(74) *Attorney, Agent, or Firm* — Oblon, McClelland, Maier & Neustadt, L.L.P.

(57) ABSTRACT

A vehicle control device comprising a display module with a display on a front face of the display module, a touch-sensitive layer, and a transparent cover attached to the front face of the display module where a front face of the transparent cover has a tactile feedback area. A haptic feedback unit is configured to provide an active haptic (Continued)

Figure 1A:
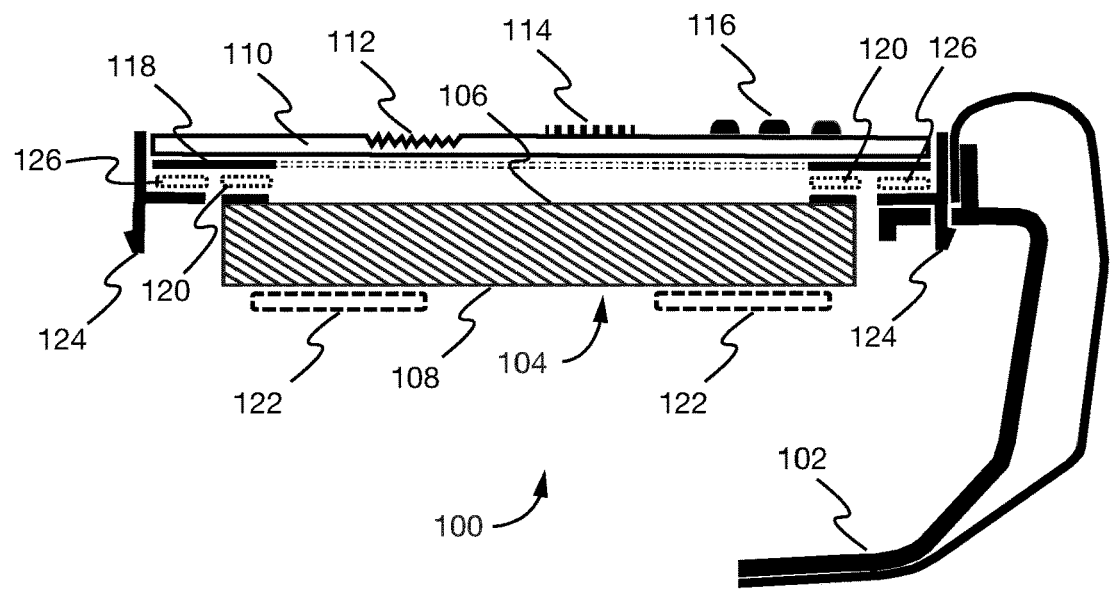

feedback by moving or deforming the transparent cover. A control unit is configured to display a graphical user interface on the display to receive a user input via the touch-sensitive layer and to trigger a vehicle function in response to the user input.

28 Claims, 4 Drawing Sheets

(51) Int. Cl.
*G06F 3/0488* (2022.01)
*H04W 4/80* (2018.01)
*B60K 35/10* (2024.01)
*B60K 35/25* (2024.01)
*B60K 35/26* (2024.01)
*B60K 35/60* (2024.01)
*B60K 35/85* (2024.01)

(52) U.S. Cl.
CPC ............. *B60K 35/10* (2024.01); *B60K 35/25* (2024.01); *B60K 35/26* (2024.01); *B60K 35/60* (2024.01); *B60K 35/85* (2024.01); *B60K 2360/111* (2024.01); *B60K 2360/141* (2024.01); *B60K 2360/1438* (2024.01); *B60K 2360/589* (2024.01); *B60K 2360/794* (2024.01); *B60K 2360/96* (2024.01)

(58) Field of Classification Search
CPC ........ B60K 2370/157; B60K 2370/158; B60K 2370/589; B60K 2370/794; B60K 2370/91; B60K 37/06; B60K 35/10; B60K 35/25; B60K 35/26; B60K 35/60; B60K 35/85; B60K 2360/111; B60K 2360/141; B60K 2360/1438; B60K 2360/589; B60K 2360/794; B60K 2360/96; G06F 3/016; G06F 3/0488; G06F 3/041; G06F 3/03547; G06F 2203/014; H04W 4/80
See application file for complete search history.

(56) References Cited

U.S. PATENT DOCUMENTS

| | | |
|---|---|---|
| 2015/0185843 A1 | 7/2015 | Olien |
| 2015/0309573 A1* | 10/2015 | Brombach ............. B60K 35/10 |
| | | 715/702 |
| 2016/0187979 A1 | 6/2016 | Nahman et al. |
| 2016/0216830 A1 | 7/2016 | Olien |
| 2016/0342215 A1* | 11/2016 | Endo ....................... G06F 3/016 |
| 2017/0136842 A1* | 5/2017 | Anderson ............. B60K 35/00 |
| 2017/0220118 A1* | 8/2017 | Dabic ..................... G06F 3/016 |
| 2018/0095590 A1 | 4/2018 | Olien |
| 2019/0375431 A1* | 12/2019 | Garcia ..................... B62D 1/06 |

* cited by examiner

VEHICLE CONTROL DEVICE AND MANUFACTURING METHOD THEREOF

FIELD OF THE INVENTION

The present invention relates to a vehicle control device for controlling a vehicle function via a touch-sensitive layer and a manufacturing method thereof.

BACKGROUND

Touchscreens have become ubiquitous in electronic devices like smartphones and are increasingly used as input devices for controlling a large variety of technical devices, for example vehicles like automobiles. While touchscreens constitute a powerful tool to enable the control of a large number of functions, e.g. of a vehicle, with a single input device, this can also make operation of such a control device complicated, thus requiring full attention of a user. For a driver of the vehicle, this poses a risk of distraction, in particular if the control device is located in a place that is not easily visible for the driver, for example the armrest of a door.

To facilitate operation of a vehicle control device, means for passive guidance or active feedback can be employed. U.S. Pat. No. 7,834,857 B2 discloses an input device for a vehicle with a touchscreen display and a haptic feedback system, wherein the haptic feedback system comprises an electronic actuator configured to move the touchscreen to provide haptic feedback. In US 2016/0187979 A1, a haptic engine for use in a vehicle infotainment system is described, wherein the haptic engine is configured to determine a texture pattern adapted to the current state of the infotainment system and to control a haptic feedback system to create a corresponding texture on a touch input surface, e.g. by deforming the surface. DE 102012020570 B4 discloses a control element with a touchscreen surface to receive a user input for controlling a vehicle component, wherein a surface of the touchscreen comprises a tactile element made of ceramic, which is configured to separate a sub area of the touchscreen surface.

Nonetheless, operating such a vehicle control device typically requires looking at the touchscreen and thus a driver of the vehicle may not be able to operate the control device while driving.

SUMMARY OF THE INVENTION

The object of the invention is thus to provide a vehicle control device, which enables intuitive distraction-free control of a vehicle function via a touch-sensitive layer requiring minimal attention.

This object is met by a vehicle control device and a manufacturing method thereof according to claim 1 and 23, respectively. Embodiments of the present invention are detailed in the dependent claims.

The vehicle control device comprises a display module with a display on a front face of the display module; a touch-sensitive layer; a transparent cover attached to the front face of the display module, wherein a front face of the transparent cover has a tactile feedback area; a haptic feedback unit configured to provide an active haptic feedback by moving or deforming the transparent cover and a control unit configured to display a graphical user interface on the display, to receive a user input via the touch-sensitive layer and to control a vehicle function in response to the user input.

In the context of the present application, "tactile" is to be understood as referring to the perception of static features, e.g. a permanent surface texture or structure, whereas the term "haptic" refers to a perception generated by dynamically altering a surface, e.g. moving or deforming a surface.

The display module is configured to receive content, e.g. a menu of a graphical user interface, from the control unit that is to be shown on the display, which is located on the front face of the display module. The display may for example be a liquid crystal display (LCD), e.g. a thin-film-transistor LCD, or an organic light-emitting diode (OLED) display, in particular a flexible OLED display.

The touch-sensitive layer is configured to detect a user input, e.g. when a user touches the transparent cover with an object like a finger. Furthermore, the touch-sensitive layer is configured to determine the position of the user input on the transparent cover, e.g. by means of capacitive, inductive and/or resistive sensing. The touch-sensitive layer may further be configured to distinguish different types of user input, for example a click by pressing the transparent cover or a touch by bringing a finger into contact with the transparent cover without pressing, or a slide movement. The touch-sensitive layer can be integrated into the display module, e.g. may be attached to the display or may be integrated in a front face layer of the display. Alternatively, the touch-sensitive layer may be integrated into the transparent cover, e.g. embedded or sandwiched in the transparent cover. In another example, the touch-sensitive layer may be independent from the display and the transparent cover and may be located between the display and the transparent cover. Preferably, the touch-sensitive layer is parallel to a front surface of the display and/or a front surface of the transparent cover.

The control unit may comprise a data storage device and a processor, wherein the data storage device may store instructions to be executed by the processor for implementing a graphical user interface, processing a user input on the touch-sensitive layer and providing a control signal for triggering at least one vehicle function. The vehicle function may for example be a door-related vehicle function, e.g. locking and unlocking the door, opening and closing the window, releasing the fuel filler or controlling the side mirror. In one example, the user may raise or lower the window in increments by tapping on a button of the graphical user interface. In another example, the graphical user interface may comprise a slider configured to move the window up and down with a sliding motion. The vehicle function may e.g. be a function associated with a vehicle seat, e.g. adjusting the seat position or controlling a seat heater, a function associated with an interior lighting of the vehicle or a function associated with a vehicle infotainment system. Preferably, the control unit is configured to trigger a plurality of vehicle functions. In one example, the display module and the control unit may be a single device providing all of the respective functionalities. The control unit may be connected to other devices in the vehicle, e.g. a vehicle control unit, an infotainment system, a motor or actuator and/or a lighting device, in particular for controlling vehicle functions. The control unit is further configured to control the haptic feedback unit in order to provide active haptic feedback as detailed below.

The transparent cover is attached to the front face of the display module. The front face (A side) of the transparent cover, facing away from the front face (B side) of the display, comprises at least one tactile feedback area. A tactile feedback area comprises a static surface feature, e.g. a surface texture, and is configured to be recognized by a user touching the front face of the transparent cover. In a tactile feedback area, the front face of the transparent cover can for example be roughened and/or pattern, wherein a roughened surface refers to a surface with a random surface texture and a patterned surface refers to a surface with a regular surface texture. Such a surface texture may for example be manufactured by molding or casting the transparent cover or by chemical etching, laser etching and/or sandblasting of the front face of the transparent cover. Alternatively or additionally, a roughened and/or patterned structure may be provided on the front face of the transparent cover in the tactile feedback area. Such a structure may e.g. be attached to the front face of the transparent cover by secondary or additive 3D printing or over-molding and/or by applying a material to the front face of the transparent cover by means of adhesive. Preferably, the front face of the transparent cover in the tactile feedback area is structured permanently.

In a preferred embodiment, a shape and/or surface texture of the tactile feedback area is configured to indicate an element of the graphical user interface associated with the position of tactile feedback area on the front face of the transparent cover. The element of the graphical user interface can for example be a button in a menu of the graphical user interface. The tactile feedback area may be located at the same position as the button and the shape of the tactile feedback area may be the same as or similar to the shape of the button in order to indicate the presence of the button to a user. In one example, the transparent cover may comprise two tactile feedback areas with different surface features, e.g. a pattern of protruding parallel lines, wherein the orientation of the lines is different in the two tactile feedback areas. Each of the two tactile feedback areas may be located at the position of a button, with the different surface features indicating different functions of the buttons, for example "OK" and "cancel". In another example, one of the tactile feedback areas may be associated with a button, whereas the other tactile feedback area is associated with a slider element for scrolling through a list in a menu of the graphical user interface. The front face of the transparent cover may for example be roughened in the tactile feedback area associated with the button, whereas it may exhibit parallel grooves running along a sliding direction of the slider in the tactile feedback area associated with the slider. Thereby, a user can locate and distinguish both elements without looking at the display.

The shape and/or surface texture of the tactile feedback area can further be configured to indicate a position of the tactile feedback area on the front face of the transparent cover. For example, a tactile feedback area may be located at an edge of the display, wherein the tactile feedback area comprises a protrusion that is parallel to the edge of the display in order to indicate to a user that a finger of the user has reached the edge of the display. In another example, the graphical user interface may comprise or consist of two sections, e.g. a first section in a first part of the display, which contains static buttons permanently associated with particular vehicle functions, e.g. opening and closing a window, and a second section in a second part of the display containing a menu with variable content. A tactile feedback area like a ridge may for example be located between the two sections to help a user distinguish the two sections.

The transparent cover can for example be made of or comprise a transparent polymer, in particular a polycarbonate or polymethylmethacrylate (PMMA), and/or glass, in particular tempered multi-layered glass. The transparent cover may be a single layer or may consist of multiple bonded layers, e.g. a polymer layer on top of a glass layer.

Preferably, the material and the thickness of the transparent cover are chosen such that the touch-sensitive layer can function properly. In one example, the thickness of the transparent cover may be less than 2 mm, preferably less than 1 mm.

As mentioned above, the touch-sensitive layer may be integrated into the transparent cover, for example by attaching the touch-sensitive layer to a back face of the transparent cover, embedding the touch-sensitive layer in a surface of the transparent cover or by sandwiching the touch-sensitive layer between two layers of the transparent cover. Alternatively, the touch-sensitive layer may be integrated into the display as described above.

The haptic feedback unit is controlled by the control unit and is configured to provide an active haptic feedback by moving or deforming the transparent cover based on commands received from the control unit. The active haptic feedback may for example be used to indicate that a user input, e.g. a click, has been detected. The haptic feedback may be provided depending on a position of a touchscreen input. Preferably, the active haptic feedback assists the user in identifying elements of the graphical user interface and/or provides orientation on the transparent cover. For example, if a user moves a finger touching the transparent cover, active haptic feedback may be provided when the finger reaches an element of the graphical user interface, e.g. by inducing a vibration of the transparent cover or by deforming the transparent cover to create a protrusion and/or depression. In particular, the transparent cover may be deformed to generate the impression of a surface deformation or surface texture for the user, e.g. a perceived protrusion, depression and/or surface texture. In this way, the user may be given the illusion of a three-dimensional (3D) shape, creating a holographic simulated interface. In particular, the haptic feedback may depend on the function of the element, e.g. to identify different buttons. For example, the transparent cover may be deformed to give the impression of a click or tap, wherein a different number of perceived taps is generated for different buttons when the finger reaches the respective button. In another example, the transparent cover may be deformed to guide the user to the location of an element of the graphical user interface, for example by creating a groove or a perceived groove leading from the location of the finger to the location of the element.

To provide the active feedback, the haptic feedback unit can comprise one or more actuators that are configured to move or deform the transparent cover. In particular, the actuator may be a piezo actuator. Alternatively, the actuator may be an electric motor or a solenoid actuator. In one example the haptic feedback unit comprises two types of actuators, e.g. a solenoid actuator for moving the transparent cover and a piezo actuator for locally deforming the transparent cover.

The actuator can be attached to a back face (B side) of the transparent cover, preferably in an area next to the display in order to not cover the display. Alternatively, the actuator may be integrated in the display module, for example behind the display as seen through the transparent cover. In another example, the actuator can be attached to a back face (C side) of the display module. If the haptic feedback unit comprises multiple actuators, each of the actuators may be located in any one of the aforementioned locations, e.g. there may be one actuator attached to the back face of the transparent cover, one actuator integrated in the display module and another actuator attached to the back face of the display module.

The front face of the display module can comprise a display contact zone surrounding the display, a back face of the transparent cover can comprise an inner contact zone forming a matching counterpart of the display contact zone and the display contact zone can be attached to the inner contact zone in order to attach the transparent cover to the display module. The display contact zone can for example be a thin stripe running along the edge of the display, wherein the stripe may e.g. have a thickness between 1 mm and 5 mm. The display contact zone can be attached to the inner contact zone with a bonding tape, sealing gasket or by chemical attachment. The display module and the transparent cover may be attached such that the distance between a surface on the back face of the transparent cover and a surface on the front face of the display module, in particular a surface of the display, is less than 3 mm, preferably less than 1 mm. In particular if the touch-sensitive layer is integrated in the display module, this distance may be important in order to ensure proper functionality of the touch-sensitive layer and chemical attachment may be used to achieve a sufficiently distance, e.g. about 0.5 mm.

In a preferred embodiment, the vehicle control device is attached to a door of the vehicle, in particular to an armrest of the vehicle door. To this end, the vehicle control device may comprise a frame, e.g. made from aluminum and/or a polymer like acrylonitrile butadiene styrene (ABS). The frame may be attached to an interior trim part of the vehicle and to the back face of the transparent cover. In one example, the back face of the transparent cover comprises an outer contact zone surrounding the inner contact zone, wherein the outer contact zone is attached to the frame. Alternatively or additionally, the frame may be attached to a side face of the transparent cover and/or the display module. The interior trim part may be the armrest of the vehicle door. For attaching the frame, bonding tape, a sealing gasket or chemical attachment may e.g. be used.

The vehicle control device can further comprise a speaker, wherein the speaker is configured to provide acoustic feedback. To this end, the control unit may be connected to the speaker and may be configured to send commands to the speaker for providing the acoustic feedback. Similar to the active haptic feedback, the acoustic feedback may be used to assist the user in identifying elements of the graphical user interface and/or provide orientation on the transparent cover. The acoustic feedback may be provided if a user input is received, in particular depending on a position of a user input on the transparent cover. For example, a sound may be emitted from the speaker when a user touches the transparent cover for the first time and/or at the location of a button. A different sound may be emitted depending on the function of a button, e.g. a first sound for an "OK" button and a second sound for a "cancel" button. The speaker also may generate speech commands and feedback.

The vehicle control device may further comprise a proximity sensor that is configured to detect the presence of an object in the vicinity of the vehicle control device. The proximity sensor may for example be an optical proximity sensor, e.g. an infrared proximity sensor, or an electromagnetic proximity sensor, e.g. a capacitive or inductive proximity sensor. The control unit may be configured to control the haptic feedback unit and/or the speaker in order to provide haptic and/or acoustic feedback depending on the presence of an object in the vicinity of the vehicle control device. For example, a sound may be emitted from the speaker, if an object has been detected by the proximity sensor, e.g. to assist a driver in locating the vehicle control device. Furthermore, the vehicle control device may be configured to switch off the display as long as no object is detected by the proximity sensor and to switch on the display once an object has been detected.

The vehicle control unit may further comprise a near-field communication (NFC) chip, wherein the control unit is configured to exchange data with a near-field communication device, e.g. a smart phone or credit card, via the near-field communication chip. In particular, the control unit may be configured to determine the identity of the near-field communication device, e.g. to identify a smartphone of a particular user. The control unit may further be configured to adapt the graphical user interface and/or a vehicle function to the near-field communication device. For example, if the smartphone of a particular user has been identified, the control unit may automatically move a vehicle seat into a predefined position associated with the particular user or may adjust an interior lighting of the vehicle according to a predefined user profile of the particular user. In the same way, a menu structure, menu layout and/or menu content may be set automatically depending on the identity of the near-field communication device.

The front face of the transparent cover may comprise a bent or curved surface portion. Correspondingly, the back face of the transparent cover may comprise a bent surface portion. In one example, the front face of the transparent cover comprises two flat surfaces, which are tilted with respect to each other and connected by the bent surface portion. The front face of the display module may for example be attached to a first flat surface on the back face of the transparent cover and the near-field communication chip may be located underneath a second flat surface on the back face of the transparent cover.

In one embodiment, the control unit is connected to an electronic control unit of vehicle. The control unit may be configured to control or trigger the vehicle function via the electronic control unit of the vehicle. In another example, the control unit of the vehicle control device may be integrated in the electronic control unit of the vehicle.

The control unit may further be configured to exchange data via a network, in particular the internet, e.g. via a local-area network port or a wireless network interface controller. The control unit may for example be configured to receive updates for the graphical user interface. In one example, the control unit may be configured to read data from a credit card via the near-field communication chip and transmit this data to an internet server, e.g. to provide payment services.

The present invention also provides a method for manufacturing a vehicle control device according to the invention. The method comprises: (1) providing a transparent cover substrate; (2) forming a transparent cover by forming a tactile feedback area on the transparent cover substrate by roughening and/or patterning a front face of the transparent cover substrate in the tactile feedback area and/or forming a roughened and/or patterned structure thereon; and (3) attaching the transparent cover substrate to a front face of a display module with a display on a front face of the display module. The numbering of the steps above is for clarity only and does not indicate a certain order. As far as technically feasible, the steps can be permuted and the method and any embodiment thereof can be performed in an arbitrary order. For example, the transparent cover substrate may be attached to the display module before forming the tactile feedback area.

The transparent cover substrate can for example be a flat plate of glass or of a transparent polymer, in particular a polycarbonate or polymethylmethacrylate (PMMA). The transparent cover substrate may consist of multiple layers, which for example are bonded by lamination, e.g. tempered multi-layered glass or a combination of glass and polymer layers. The transparent cover substrate may also have a bent surface portion, e.g. by cold forming, hot forming, casting or molding the transparent cover substrate. In one example, the transparent cover substrate may comprise the touch-sensitive layer.

To form the tactile feedback area, the front face of the transparent cover substrate can be roughened in the tactile feedback area or in a portion of the tactile feedback area, e.g. by sandblasting, chemical etching and/or laser etching. To achieve a desired shape of the tactile feedback area, a mask may be used for forming the tactile feedback area. Alternatively or additionally, the front face of the transparent substrate in the tactile feedback area may be patterned with a regular surface texture, e.g. by laser etching or using a mask. In one example, a tactile feedback area may be formed by forming a recess or protrusion on the front face of the transparent cover substrate. Forming the tactile feedback area may also comprise casting or molding the transparent cover substrate. Furthermore, a roughened and/or patterned structure may be formed on the front face of the transparent cover in the tactile feedback area, for example by overmolding or 3D printing, wherein the material used for the roughened and/or patterned structure is preferably transparent and may be the same material as that of the transparent cover substrate. In one example, a plurality of tactile feedback areas are formed, each of which may exhibit a different surface texture.

The transparent cover substrate can be attached to the front face of the display module before, during or after forming the tactile feedback area. In one example, the transparent cover substrate may be molded to form a recess or protrusion in a tactile feedback area on the front face of the transparent cover substrate and may subsequently be attached to the front face of the display module, before additionally roughening the front face of the transparent cover substrate in the tactile feedback area. The transparent cover substrate may be attached to the front face of the display module e.g. using a bonding tape, a sealing gasket or by chemical attachment. Attaching the transparent cover substrate to the display module may further comprise providing a touch-sensitive layer in between the transparent cover substrate and the front face of the display module, if the touch-sensitive layer is not integrated into the transparent cover substrate or the display module. Furthermore, attaching the transparent cover substrate to the display module may comprise attaching one or more actuators of the haptic feedback unit to the transparent cover substrate and/or the display module.

The method can further comprise attaching the vehicle control device to an interior trim part of a vehicle, in particular an armrest of a vehicle door. For this, the transparent cover may be attached to a frame, e.g. using a bond tape, a sealing gasket or by chemical attachment, and the frame may be attached to the interior trim part, e.g. through a bonding tape, chemical attachment and/or mechanical attachment, e.g. using a latch or hook, clips or the like. In other examples, the transparent cover and/or the display module may directly be attached to the interior trim part, e.g. through a bonding tape, chemical attachment and/or mechanical attachment. Attaching the vehicle control device to the interior trim part may further comprise fixedly connecting one or more actuators to the interior trim part or another stationary component of the vehicle.

The method can also comprise bending the transparent cover substrate to create a bent surface portion, for example by cold forming or hot forming. In particular, the transparent cover substrate may be bent while attaching the vehicle control device to the interior trim part of the vehicle. In one example, a trim bezel may be used for bending the transparent cover substrate. The interior trim part may for example comprise a carrier portion configured to receive the vehicle control device. The transparent cover substrate may be bent by placing it on the carrier portion and subsequently pressing the trim bezel against the carrier portion from above. Additionally, the transparent cover may be attached to the carrier portion as described above. The trim bezel may be attached to the interior trim part as well in order to secure the transparent cover. Furthermore, the trim bezel may also comprise a tactile feedback area or a guiding feature like a notch or a protrusion extending parallel to the front face of the transparent cover.

Providing the transparent cover substrate can comprise laminating two or more layers to form the transparent cover substrate. For example, two glass and/or transparent polymer layers may be combined with an interlayer in between, e.g. a foil of polyvinyl butyral (PVB), thermoplastic polyurethane (TPU) or ethylene-vinyl acetate (EVA). Additionally, the transparent cover substrate may be formed into a desired shape during the lamination process, e.g. by stacking the glass and/or transparent polymer layers and the interlayer, pressing the layered stack onto a laminating framework and clamping it into place before the lamination process.

SHORT DESCRIPTION OF DRAWINGS

Figure 1B:
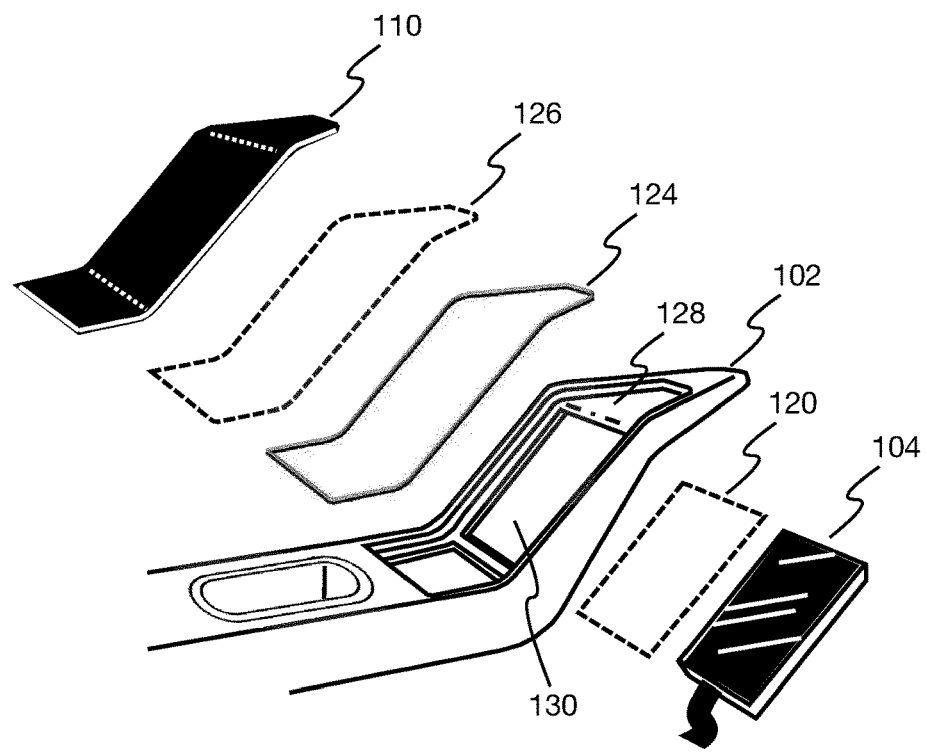
Figure 2:
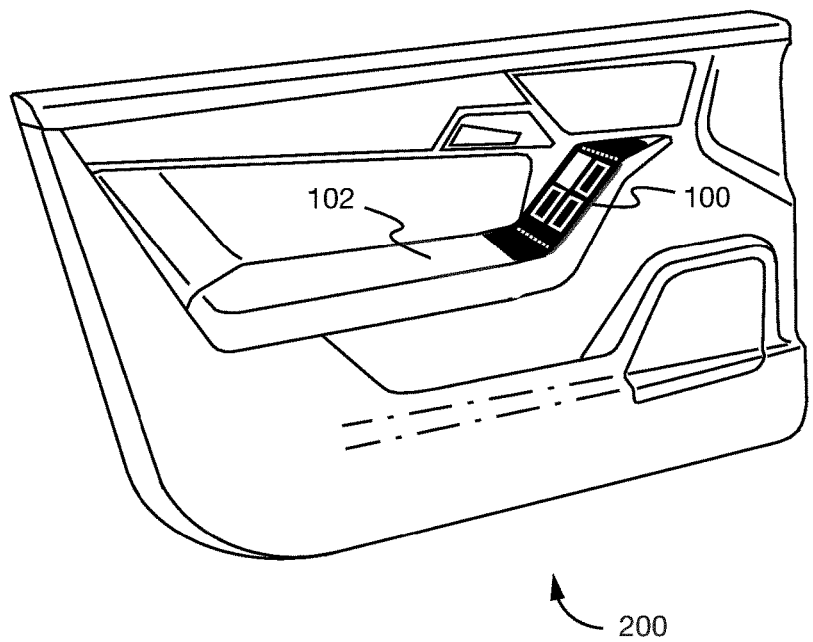
Figure 4:
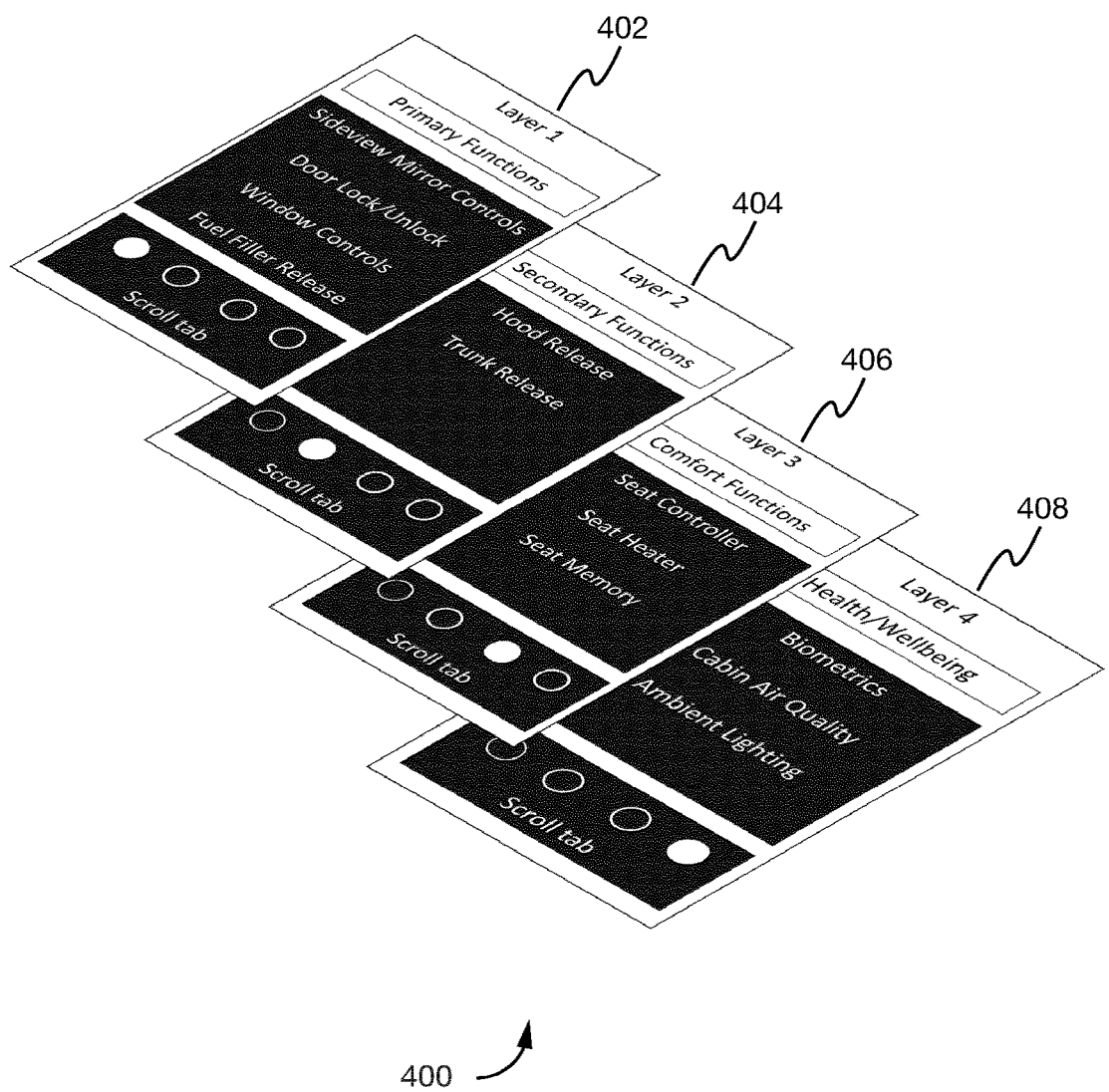
Figure 5A:
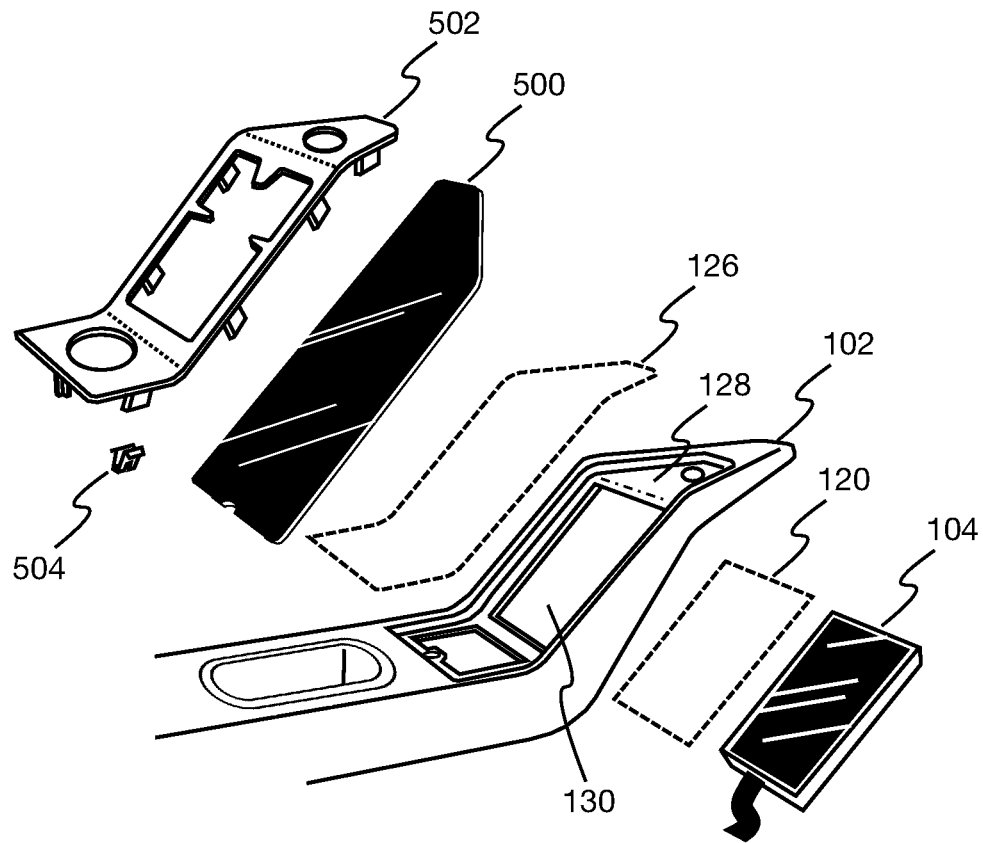
Figure 5B:
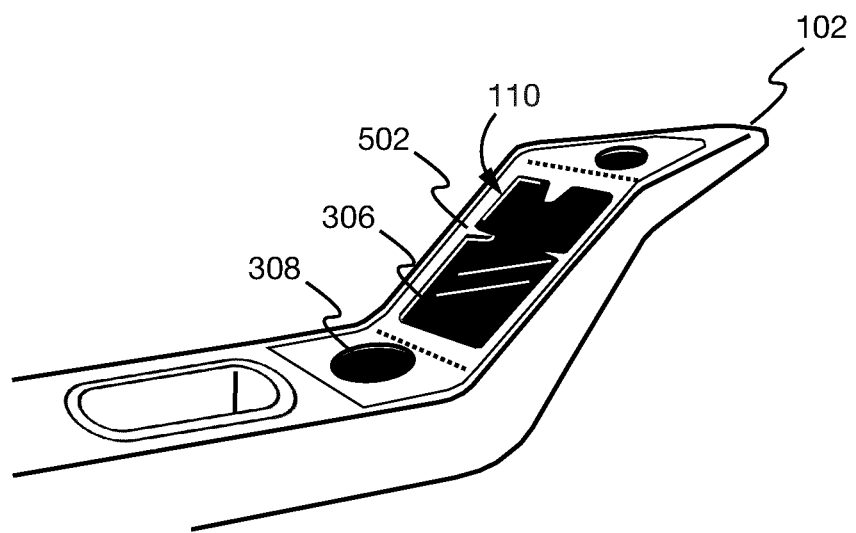

In the following, a detailed description of the invention and exemplary embodiments thereof is given with reference to the figures, wherein:

FIG. 1a: schematically illustrates an example of a vehicle control device according to an embodiment of the invention;

FIG. 1b: schematically illustrates the assembly of a vehicle control device in accordance with an exemplary embodiment of the invention;

FIG. 2: schematically illustrates an example of a vehicle door with an armrest and a vehicle control device according to an embodiment of the invention;

FIGS. 3a-3d: schematically illustrate examples of a vehicle control device according to various embodiments of the invention;

FIG. 4: schematically illustrates an example of a graphical user interface in accordance with an embodiment of the invention;

FIG. 5a: schematically illustrates the assembly of a vehicle control device with bending of the transparent cover substrate according to an exemplary embodiment of the invention;

FIG. 5b: schematically illustrates the vehicle control device of FIG. 5a after the assembly.

DESCRIPTION OF EXAMPLES

FIG. 1a depicts a cross section of a vehicle control device 100 according to an example of the invention. The vehicle control device 100 is attached to an interior trim part of a vehicle, e.g. an armrest 102 of a vehicle door. The vehicle control device 100 comprises a display module 104 with a front face 106 and a back face 108. A display (not shown) is located on the front face 106 in order to display content to a user looking at the front face 106. The vehicle control device 100 also comprises a control unit (not shown). The control unit may for example be integrated in the display module 104, an electronic control unit of the vehicle or may be a separate unit, which is e.g. placed underneath the display module 104 and/or may be attached to the armrest 102.

The vehicle control device 100 further comprises a transparent cover 110, which is attached to the front face 106 of the display module. A front face of the transparent cover 110 has three tactile feedback areas 112, 114, and 116, all of which may extend in the direction perpendicular to the drawing plane shown in FIG. 1*a*. In the tactile feedback area 112, the front face of the transparent cover 110 is roughened, e.g. by sandblasting or etching, and has an irregular surface texture. In the tactile feedback area 114, the front face of the transparent cover 110 exhibits a plurality of protrusions, which are arranged in a periodic pattern and which may be integrally formed therein, for example by injection molding of the transparent cover 110. In the tactile feedback area 116, surface elements are attached to the front face of the transparent cover 110, creating a patterned structure thereon. The surface elements in the tactile feedback area 116 may for example be created by additive 3D printing or bonding of a material layer on the front face of the transparent cover 110.

Furthermore, a print layer 118 may be provided, which comprises one or more elements printed on or etched into e.g. the back face of the transparent cover 110, for example to highlight an edge or a particular section of the display or to create a smooth transition between the vehicle control device too and its surroundings. The print layer 118 may for example cover the area in which the transparent cover 110 is attached to other components, e.g. the display module 104.

The transparent cover 110 is attached to the display module 104 by a bonding material 120, e.g. a bonding tape, glue or a chemical attachment material and/or a sealing gasket. The bonding material 120 may for example be provided between a display contact zone at the edge of the front face 106 of the display module 104, e.g. on a frame around the display, and an inner contact zone on the back side of the transparent cover 110.

The vehicle control device 100 further comprises a haptic feedback unit 122, which in this example comprises two actuators, e.g. piezo actuators, that are attached to the back face 108 of the display module 104, preferably in a non-visible area. The actuators may for example be configured to move back and forth in a direction perpendicular to the back face 108, e.g. in order to press against the back face 108. For this, an end portion of each actuator op-posing the portion attached to the back face 108 may be fixedly connected to a stationary component, e.g. the armrest 102. In other examples, one or more actuators may alternatively or additionally be integrated in the display module 104, e.g. located behind the display as seen through the transparent cover 110, or may be attached to the transparent cover 110, e.g. adjacent to the bonding material 120, preferably in a location where the actuator does not cover the display, e.g. between the bonding materials 120 and 126.

To provide haptic feedback, an actuator attached to the back face 108 of the display module 104 may for example periodically press against the back face 108 to induce an oscillatory motion or deformation of the display module 104, which e.g. via the bonding material 120 can create a vibration of the transparent cover 110 in the direction perpendicular to its front face. The vibration may be an up-and-down motion of the entire transparent cover 110 or a wave-like deformation of the front face of the transparent cover 110. In particular, a frequency of the modulation by the actuator may be adapted to a resonance frequency of the transparent cover 110 and/or the display module 104. In another example, an actuator may be configured to perform a lateral motion that is parallel to the back face 108 in order to induce a lateral vibration of the transparent cover 110. An actuator that is attached to the transparent cover 110 may for example press against the back face of the transparent cover 110 to deform the transparent cover 110, thereby e.g. creating a temporary protrusion on the front face of the transparent cover 110. This may for example be used to generate a tap or click by pressing against the back face of the transparent cover 110 for a short amount of time, e.g. 0.2 seconds, and subsequently retracting the actuator. Such a tap may be repeated multiple times in succession, e.g. to indicate a function of a button on the location of which the finger of a user is placed.

The vehicle control device 100 also comprises a frame 124, which is attached to the back face of the transparent cover 110 via the bonding material 126, e.g. a bonding tape or a chemical attachment material. The frame 124 is further attached to the armrest 102 of the vehicle door, e.g. through a bonding tape, chemical attachment and/or mechanical attachment, e.g. using a latch or hook, clips or the like. In another example, the display module 104 may also be attached to the armrest 102 and/or frame 124. Alternatively or additionally, the armrest 102 and/or the frame 124 may provide mechanical support for the display module 104.

FIG. 1*b* illustrates an exploded view of an example for the assembly of a vehicle control device according to an embodiment of the invention, e.g. the vehicle control device 100. The transparent cover 110 is attached to the frame 124 via the bonding material 126. The bonding material 126 may for example be provided between an outer contact zone adjacent to the edge of the back face of the transparent cover 110 and a matching surface on the frame 124. The bonding material 126 may be provided throughout the outer contact zone or at isolated locations within the outer contact zone.

The armrest 102 comprises a carrier portion comprising a recess 128 with an opening 130, in which the vehicle control device 100 is to be mounted. The recess 128 may be configured to house the frame 124 and the transparent cover 110, wherein the frame is attached to the armrest 102. In another example, the vehicle control device may not comprise a frame 124, but the transparent cover 110 may be attached to the armrest 102 directly. Preferably, the recess 128 is shaped such that the transparent cover 110 forms a smooth surface with the adjacent surfaces of the armrest 102. The opening 130 may be configured to house the display module 104.

The display module 104 is attached to the transparent cover 110 using the bonding material 120, which may for example be applied between the display contact zone of the display module 104 and the inner contact zone of the transparent cover 110. Similar to the bonding material 126, the bonding material 120 may be applied throughout the two contact zones or may be provided at isolated locations between the two contact zones. The display module 104 may be attached to the transparent cover 110 before or after attaching the transparent cover 110 to the frame 124 and/or attaching the frame 124 to the armrest 102.

In one example, the frame 124 is first attached to the transparent cover 110 and subsequently the frame 124 is attached to the armrest 102 by placing the transparent cover 110 and the frame 124 in the recess 128. Finally, the display module 104 is inserted through the hole 130 from behind as seen through the transparent cover 110 mounted in the recess 128 and attached to the transparent cover 110.

FIG. 2 shows an example of a vehicle door 200 comprising the armrest 102 and a vehicle control device according to an embodiment of the invention, e.g. the vehicle control device 100, which is attached to the armrest 102, e.g. as described above with reference to FIG. 1b. In other examples, the vehicle control device 100 may also be attached to other parts of the vehicle door 200, e.g. a door trim part above or below the armrest 102.

Figure 3A:
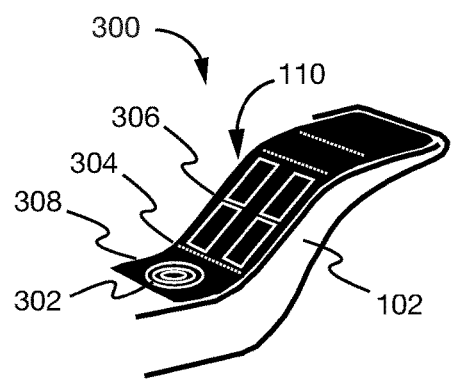

FIGS. 3a-3d illustrate different examples of vehicle control device according to various embodiments of the invention, each of which is attached to the armrest 102. In FIG. 3a, a vehicle control device 300 is shown, which is similar to the vehicle control device 100 described above. In addition, the vehicle control device 300 comprises a near-field communication chip 302, which is placed underneath the transparent cover 110 and may for example be attached to a surface on the back face of the transparent cover or the armrest 102. The transparent cover 110 of the vehicle control device 300 comprises a bent or curved surface portion 304, which connects two flat surfaces 306 and 308. The display module 104 (not shown) may for example be located underneath the flat surface 306. In another example, the front face of the display module 104 may also comprise a flat surface and a bent surface portion, e.g. using a flexible OLED display, and may be located underneath the flat surface 306 and the bent surface portion 304. The near-field communication chip 302 can for example be located underneath second flat surface 308, e.g. to facilitate a connection to a near-field communication device without obstructing the view of the display. In addition, the surface 110 can contain additional bent and/or flat surface portions as illustrated by the dashed lines on the surface 110 in FIG. 3a.

Figure 3B:
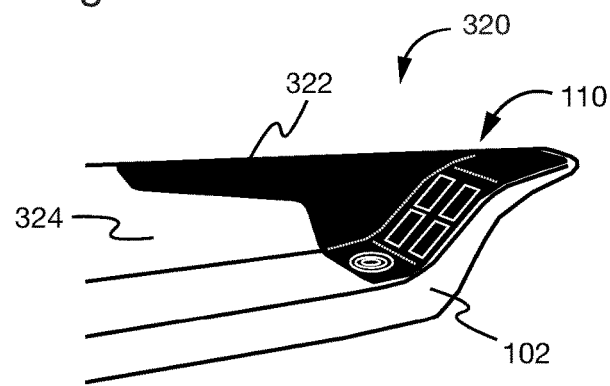

FIG. 3b depicts a vehicle control device 320, which is similar to the vehicle control device 300 of FIG. 3a. Additionally, the front face of the transparent cover 110 of the vehicle control device 320 comprises a side surface 322, which may be connected to the surfaces 304, 306 and/or 308 through another bent surface portion. The side surface 322 can for example be connected to an adjacent interior trim part, e.g. the door trim part 324 above the armrest 102.

Figure 3C:
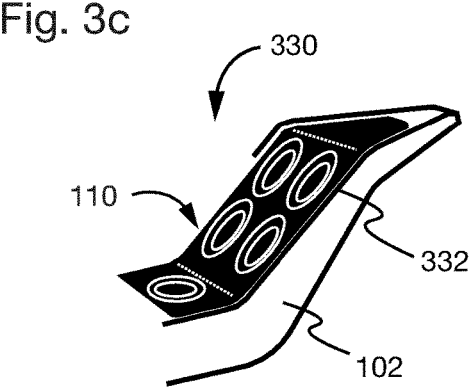

FIG. 3c illustrates a vehicle control device 330, which differs from the vehicle control device 300 in the tactile feedback areas on the front face of the transparent cover 110. Whereas the tactile feedback areas of vehicle control device 300 have a rectangular shape and may e.g. have a roughened surface, the tactile feedback areas of vehicle control device 330 have a round shape and the front face of the transparent cover 110 of the vehicle control device 330 exhibits a 3D shape like a recess or a depression in each of the tactile feedback areas. Furthermore, the number of tactile feedback areas may be different, e.g. the vehicle control device 330 may comprise a fifth tactile feedback area on the surface 308 instead of the near-field communication chip 302. Correspondingly, the display may also extend from the flat surface 306 via the bent surface portion 304 to the flat surface 308.

Figure 3D:
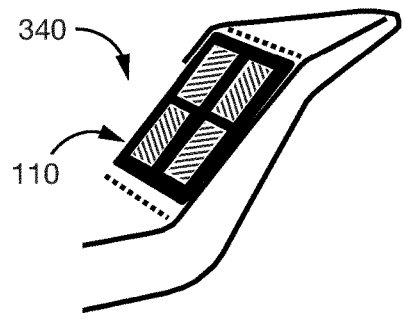

In FIG. 3d, a vehicle control device 340 according to another embodiment of the present invention is shown. Similar to the vehicle control device 300, the transparent cover 110 of the vehicle control device 340 comprises four rectangular tactile feedback areas. This can for example be representative of side window controls for four vehicle doors, which may e.g. be displayed underneath the tactile feedback areas. In other examples, the transparent cover may comprise a different number of tactile feedback areas. In this example, the front face of the transparent cover 110 in the tactile feedback areas exhibits a regular surface pattern consisting of parallel lines, which may e.g. be grooves in the front face or protruding lines. Furthermore, the orientation of the lines may be different in different tactile areas, thereby al-lowing a user to distinguish the tactile areas without looking. In the example shown in FIG. 3d, the lines are perpendicular to the direction towards the center of the front face of the transparent cover 110 as seen from the respective tactile area.

FIG. 4 shows an example of a graphical user interface in accordance with an embodiment of the invention. The graphical user interface comprises a menu with a layer structure, e.g. four different layers 402, 404, 406, and 408, each of which may be used to control a different set of vehicle functions. The graphical user interface is divided into two sections, a first section displaying the respective layer of the menu and for controlling the respective vehicle functions and a second section for navigation between different layers of the menu, e.g. by swiping on the corresponding portion of the front face. The front face of the transparent cover 110 may for example comprise a tactile feedback area located between the two sections such that a user can locate the two sections without looking at the vehicle control device.

To facilitate operation of the vehicle control device, each layer may comprise a set of vehicle functions that are related, e.g. similar functions like motor hood release and trunk release as in layer 404 or functions associated with the same device, e.g. a seat of the vehicle as in layer 406 controlling the seat adjustment and the seat heater. Furthermore, the menu may be structured such that functions associated with the location of the vehicle control device, e.g. a door, are contained in primary layer, which may be the default layer displayed upon start up and/or activation of the vehicle control device and is thus usually accessible. For example, the layer 402 may contain the side view mirror controls, the door lock and unlock button, the fuel filler release button and window controls. Other functions may be in secondary layers that can e.g. only be accessed by swiping on the navigation section. The items in each of the layers may be buttons activating a particular vehicle function, e.g. door lock and unlock, or may lead to an additional sublayer of the menu with controls for controlling the respective vehicle functions, e.g. the side view mirror controls.

FIG. 5a schematically illustrates an exploded view of the assembly of a vehicle control device, e.g. the vehicle control device 100, to illustrate manufacture thereof, including bending of the transparent cover substrate according to an exemplary embodiment of the invention. The assembled vehicle control device is shown in FIG. 5b. The armrest 102 is similar to the one shown in FIG. 1b and comprises a carrier portion including a recess 128 with an opening 130. A transparent cover substrate 500, which may e.g. comprise glass and/or a transparent polymer and may already exhibit one or more tactile feedback areas, is placed on the recess 128. Additionally, a bonding material 126 may be placed between the recess 128 and the transparent cover substrate 500 in order to attach the transparent cover substrate 500 to the armrest 102. In this example, no frame is used but in other examples the transparent cover substrate 500 may be attached to a frame similar to the one shown in FIG. 1b.

A trim bezel 502 is used for bending the transparent cover substrate 500 to form the transparent cover 110 and securing the transparent cover 110 in the assembled vehicle control device. The trim bezel 502 may for example be made of a metal like aluminum or a polymer like acrylonitrile butadiene styrene (ABS), polycarbonate or polyoxymethylene (POM), e.g. by molding, casting or 3D printing. The trim bezel 502 may be attached to the armrest 102, e.g. mechanically using fasteners 504. By pressing the trim bezel 502 towards the recess 128 and against the transparent cover substrate 500 placed on the recess 128, the transparent cover substrate 500 can be bent, thereby forming the transparent cover 110. As described above with reference to FIG. 3a, the transparent cover 110 can for example have two flat surfaces 306 and 308 connected by a bent surface portion, which in the example shown in FIG. 5b is hidden underneath the trim bezel 502 and indicated by the dashed line between the surfaces 306 and 308.

The embodiments of the present invention disclosed herein only constitute specific examples for illustration purposes. The present invention can be implemented in various ways and with many modifications without altering the underlying basic properties. There-fore, the present invention is only defined by the claims as stated below.

The invention claimed is:

1. A vehicle control device, wherein the vehicle control device comprises:
    a display module with a display on a front face of the display module,
    a touch-sensitive layer,
    a transparent cover attached to the front face of the display module, wherein a front face of the transparent cover has a tactile feedback area,
    a haptic feedback unit configured to provide an active haptic feedback by moving or deforming the transparent cover; and
    a control unit configured to display a graphical user interface on the display, to receive a user input via the touch-sensitive layer and to trigger a vehicle function in response to the user input,
    wherein the tactile feedback area comprises a static surface feature that is a roughened and/or patterned area and/or a roughened and/or patterned structure provided in the tactile feedback area.

2. The vehicle control device of claim 1, wherein the front face of the transparent cover is permanently structured in the tactile feedback area.

3. The vehicle control device according to claim 1, wherein a shape and/or surface texture of the tactile feedback area is configured to indicate an element of the graphical user interface associated with a position of the tactile feedback area on the front face of the transparent cover.

4. The vehicle control device according to claim 1, wherein a shape and/or surface texture of the tactile feedback area is configured to indicate a position of the tactile feedback area on the front face of the transparent cover.

5. The vehicle control device according to claim 1, wherein the transparent cover comprises a glass, selected from the group consisting of a tempered multi-layered glass, and/or a transparent polymer.

6. The vehicle control device according to claim 1, wherein the touch-sensitive layer is integrated into the display or the transparent cover.

7. The vehicle control device according to claim 1, wherein the haptic feedback unit comprises an actuator configured to move or deform the transparent cover.

8. The vehicle control device of claim 7, wherein the actuator is a piezo actuator.

9. The vehicle control device according to claim 7, wherein the actuator is attached to a back face of the transparent cover, is integrated in the display module, or is attached to a back face of the display module.

10. The vehicle control device according to claim 1, wherein the front face of the display module comprises a display contact zone surrounding the display,
    a back face of the transparent cover comprises an inner contact zone forming a matching counterpart of the display contact zone; and
    the display contact zone is attached to the inner contact zone.

11. The vehicle control device according to claim 1, wherein the vehicle control device is attached to a door of a vehicle.

12. The vehicle control device according to claim 1, further comprising a frame, wherein the frame is attached to an interior trim part of a vehicle, and to a back face of the transparent cover.

13. The vehicle control device according to claim 10, wherein the back face of the transparent cover comprises an outer contact zone surrounding the inner contact zone and the outer contact zone is attached to the frame.

14. The vehicle control device according to claim 1, further comprising a speaker configured to provide acoustic feedback.

15. The vehicle control device according to claim 1, further comprising a proximity sensor configured to detect the presence of an object in the vicinity of the vehicle control device.

16. The vehicle control device according to claim 1, wherein the control unit is configured to control the haptic feedback unit and/or the speaker in order to provide haptic and/or acoustic feedback depending on a position of the user input and/or a presence of an object in a vicinity of the vehicle control device.

17. The vehicle control device according to claim 1, further comprising a near-field communication chip, wherein the control unit is configured to exchange data with a near-field communication device via the near-field communication chip.

18. The vehicle control device of claim 17, wherein the control unit is configured to determine the identity of the near-field communication device and to adapt the graphical user interface and/or the vehicle function to the near-field communication device.

19. The vehicle control device according to claim 1, wherein the front face of the transparent cover comprises a bent surface portion.

20. The vehicle control device according to claim 1, wherein the control unit is connected to an electronic control unit of the vehicle.

21. The vehicle control device according to claim 1, wherein the control unit is configured to exchange data via a network.

22. A method for manufacturing a vehicle control device according to claim 1, the method comprising:
    providing a transparent cover substrate;
    forming the transparent cover by forming a tactile feedback area on the transparent cover substrate by roughening and/or patterning a front face of the transparent cover substrate in the tactile feedback area and/or forming a roughened and/or patterned structure thereon; and
    attaching the transparent cover substrate to the front face of the display module with a display on a front face of the display module.

23. The method of claim 22, further comprising attaching the vehicle control device to an interior trim part of a vehicle.

24. The method of claim 22, wherein forming the transparent cover further comprises bending the transparent cover substrate to create a bent surface portion.

25. The method of claim 24, wherein the transparent cover substrate is bent while attaching the vehicle control device to the interior trim part of the vehicle.

26. The method according to claim 22, wherein providing the transparent cover substrate comprises laminating two or more layers to form the transparent cover substrate.

27. The vehicle control device according to claim 1, wherein the static surface feature in the tactile feedback area is a roughened and/or patterned area formed by molding or casting the transparent cover or by chemical etching, laser etching and/or sandblasting the front face of the transparent cover.

28. The vehicle control device according to claim 1, wherein the static surface feature in the tactile feedback area is a roughened and/or patterned structure provided by secondary or additive 3D printing and/or by over-molding.

\* \* \* \* \*